United States Patent
Sorenson et al.

(10) Patent No.: US 11,275,099 B1
(45) Date of Patent: Mar. 15, 2022

(54) NAVIGATIONAL GRADE RESONANT MICROELECTROMECHANICAL SYSTEMS (MEMS) ACCELEROMETER AND METHOD OF OPERATION

(71) Applicant: HRL Laboratories, LLC, Malibu, CA (US)

(72) Inventors: Logan D. Sorenson, Thousand Oaks, CA (US); Lian X. Huang, Thousand Oaks, CA (US); Raviv Perahia, Malibu, CA (US); Hung Nguyen, Los Angeles, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/512,091

(22) Filed: Jul. 15, 2019

Related U.S. Application Data

(60) Provisional application No. 62/701,240, filed on Jul. 20, 2018.

(51) Int. Cl.
*G01P 15/18* (2013.01)
*G01P 15/13* (2006.01)
*G01P 1/02* (2006.01)

(52) U.S. Cl.
CPC .............. *G01P 15/18* (2013.01); *G01P 15/13* (2013.01); *G01P 1/023* (2013.01)

(58) Field of Classification Search
CPC ........ G01P 15/18; G01P 15/13; G01P 15/097; G01P 15/0802; G01P 15/125; G01P 1/023
See application file for complete search history.

(56) References Cited

U.S. PATENT DOCUMENTS

| | | | | |
|---|---|---|---|---|
| 4,805,456 A * | 2/1989 | Howe | ................... | G01P 15/097 73/514.18 |
| 5,880,369 A * | 3/1999 | Samuels | ............... | B81B 3/0078 361/280 |
| 5,895,851 A * | 4/1999 | Kano | .................... | G01P 15/124 73/504.04 |
| 7,103,477 B1 | 9/2006 | Lee | | |
| 7,337,671 B2 | 3/2008 | Ayazi | | |
| 8,671,756 B2 * | 3/2014 | Comi | ...................... | G01P 15/18 73/514.29 |
| 9,696,340 B2 | 7/2017 | Trusov | | |
| 9,874,581 B2 * | 1/2018 | Tin | .......................... | G01P 21/00 |
| 2001/0002551 A1 * | 6/2001 | Kawai | ................. | G01P 15/0802 73/504.12 |

(Continued)

OTHER PUBLICATIONS

U.S. Appl. No. 16/673,878.

(Continued)

*Primary Examiner* — Helen C Kwok
(74) *Attorney, Agent, or Firm* — Ladas & Parry

(57) ABSTRACT

A resonant accelerometer includes a proof mass, one or more springs connecting the proof mass to an anchor, and one or more capacitive transduction gaps providing a void or space between the movable proof mass and a corresponding fixed electrode, wherein the static displacement of the proof mass in response to acceleration applied to the anchor modifies the electrostatic stiffness imparted by one or more of the capacitive transduction gaps on the proof mass, resulting in a corresponding change in the resonance frequency of the resonant accelerometer.

29 Claims, 12 Drawing Sheets

Scale Factor:

$$\Gamma = \frac{df_n}{da_{in}} \approx \frac{3}{4\pi} \frac{\epsilon A}{M_{eff}\omega_n^3 g_0^4} \left[ \frac{(V_P-V_C)^2}{\left(1-\frac{x_s}{g_0}\right)^4} - \frac{(V_P-V_B)^2}{\left(1+\frac{x_s}{g_0}\right)^4} \right]$$

Traditional thinking:
$V_B = V_C = 0 \rightarrow x_s = 0 \rightarrow \Gamma = 0$ New Insight:
$V_B \neq V_C \rightarrow x_s \neq 0 \rightarrow \Gamma \gg 0$

(56) References Cited

U.S. PATENT DOCUMENTS

| | | | | |
|---|---|---|---|---|
| 2006/0005603 | A1* | 1/2006 | Chau | G01P 15/125 73/1.38 |
| 2008/0012449 | A1* | 1/2008 | Lee | H02N 1/008 310/309 |
| 2009/0145230 | A1* | 6/2009 | Ikeuchi | G01P 15/125 73/514.32 |
| 2011/0138931 | A1* | 6/2011 | Hashiguchi | G01L 1/10 73/862.59 |
| 2014/0165724 | A1* | 6/2014 | Krylov | G01P 15/125 73/514.15 |
| 2014/0284603 | A1* | 9/2014 | Su | G01P 15/097 257/49 |
| 2015/0226762 | A1* | 8/2015 | Seshia | G01P 15/097 73/495 |
| 2016/0169935 | A1* | 6/2016 | Trusov | G01C 19/5783 73/1.38 |
| 2016/0334439 | A1* | 11/2016 | Malvern | B81B 5/00 |
| 2016/0349283 | A1* | 12/2016 | Bramhavar | G01P 15/093 |
| 2017/0108529 | A1* | 4/2017 | Zhang | G01P 15/18 |
| 2018/0209791 | A1* | 7/2018 | Chang | G01C 19/5747 |
| 2019/0055116 | A1* | 2/2019 | Shirvani | B81B 7/008 |
| 2020/0096536 | A1* | 3/2020 | Zou | G01P 15/0802 |

OTHER PUBLICATIONS

Colibrys MS 1000 accelerometer: www.colibrys.com/product/ms1000-mems-accelerometer/ (Printed: Jan. 16, 2020).

Comi, et al., "A new biaxial silicon resonant micro accelerometer," in 2011 IEEE 24th International Conference on Micro Electro Mechanical Systems, 2011, pp. 529-532.

Hopkins, R., "The Silicon Oscillating Accelerometer: A High-Performance MEMS Accelerometer for Precision Navigation and Strategic Guidance Applications", *The Draper Technology Digest*, vol. 10, CSDL-R-3005, 2006, pp. 4-13.

Zotov et al., "High Quality Factor Resonant MEMS Accelerometer with Continuous Thermal Compensation", IEEE Sensors Journal, vol. 15, No. 9, Sep. 2015.

\* cited by examiner

VRW [ μg / √Hz ]

$$\sqrt{\frac{4k_B T \cdot (2\pi f_n)}{M_{eff} Q}}$$

$VRW \propto \sqrt{f_n}$

Dynamic Range [ dB ]

$$20 \cdot \log\left(\frac{2 \cdot (2\pi f_n)^2 \cdot \frac{g_0}{3}}{BS}\right)$$

$Dynamic\ Range \propto f_n^2$

Scale Factor [ Hz / g ]

$$\Gamma = \frac{df_n}{da_{ex}} \approx \frac{3}{4\pi M_{eff}(2\pi f_n)^3 g_0^4} \epsilon A \left[\frac{(V_P - V_C)^2}{\left(1 - \frac{x_c}{g_0}\right)^4} - \frac{(V_P - V_B)^2}{\left(1 + \frac{x_c}{g_0}\right)^4}\right]$$

$\Gamma \propto \dfrac{1}{f_n^3}$

Fig. 8

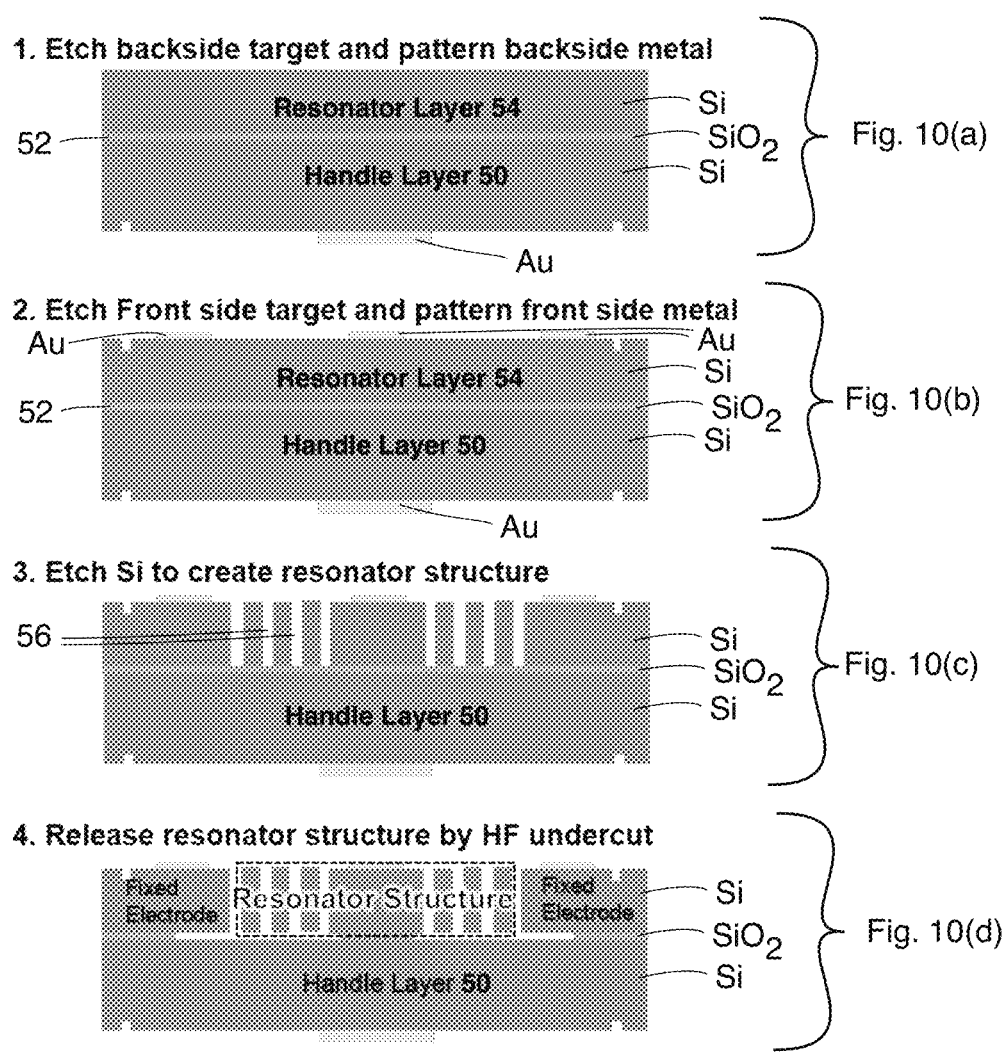

NAVIGATIONAL GRADE RESONANT MICROELECTROMECHANICAL SYSTEMS (MEMS) ACCELEROMETER AND METHOD OF OPERATION

CROSS REFERENCE TO RELATED APPLICATIONS

This application claims the benefit of US Provisional Patent Application No. 62/701,240 filed Jul. 20, 2018 and entitled "A Navigational Grade Resonant MicroElectroMechanical Systems (MEMS) Accelerometer and Method of Operation", the disclosure of which is hereby incorporated herein by reference.

This application is related to US Provisional Patent Application No. 62/788,254 filed Jan. 4, 2019 and entitled "Continuous Online Self-Calibrating Resonant FM MicroElectroMechanical Systems (MEMS) Accelerometer" and to its related Non-Provisional application Ser. No. 16/673,878 filed Nov. 4, 2019, the disclosure of US Provisional Patent Application No. 62/788,254 is hereby incorporated by reference.

STATEMENT REGARDING FEDERALLY SPONSORED RESEARCH OR DEVELOPMENT

None.

TECHNICAL FIELD

This present invention relates to a Navigational Grade Resonant MicroElectroMechanical Systems (MEMS) Accelerometer and its Method of Operation.

BACKGROUND

Environmentally-robust, high-performance inertial sensors with attractive CSWaP (Cost, Size, Weight and Power) are in strong demand in a number of industries, including natural mineral exploration, vehicle and aircraft safety, autonomous navigation systems, military applications, and emergency location services, to name a few.

In contrast to prior art static accelerometers, where a low Q factor is desired to avoid ringing in the accelerometer response, the presently disclosed technology, by utilizing MEMS design and vacuum packaging technologies, produces silicon accelerometer structures with Q factors greater than 10,000 with natural frequencies greater than 10 kHz. Static prior art MEMS accelerometers are limited to dynamic ranges <$10^6$ by their amplitude modulation (AM) readout mechanism. The disclosed FM mechanism employed in the disclosed accelerometer provides dynamic ranges >$10^9$. Such a large dynamic range is useful to enable large input ranges (>±100 g to ±1000 g) while simultaneously preserving the ability to accurately resolve small inertial signals below 1 μg. This level of dynamic range performance is currently not available in an off-the-shelf accelerometer. In addition, since the disclosed device operates at a higher natural frequency than a static accelerometer, our device is 25 to 2500× less sensitive to spurious vibration signals which corrupt the true inertial acceleration signal.

The prior art includes: U.S. Pat. No. 9,696,340: "Multi-axis chip-scale MEMS inertial measurement unit (IMU) based on frequency modulation" and Zotov et al., "High Quality Factor Resonant MEMS Accelerometer with Continuous Thermal Compensation", *IEEE Sensors Journal*, Vol. 15, No. 9, September 2015.

This patent and published journal describe what may well be the closest prior art. What this prior art described is a resonant MEMS accelerometer consisting of two independent resonators formed from two coupled masses each. This may well be the closest prior art because it describes a resonant MEMS accelerometer which uses the nonlinearity of a biased capacitive transduction gap to create a frequency shift of a resonance mode of the structure, similar to our approach (other resonant MEMS accelerometers typically use some sort of mechanically-induced frequency shift, rather than an electrostatically-induced frequency shift generated through the nonlinearity of a capacitive transduction gap, as explained in detail below). The disadvantages of the aforementioned prior art approach are (1) each resonator requires two proof masses to create the described in-phase and anti-phase modes as opposed to a single proof mass in our approach, complicating the device design and potentially trading available proof mass (required for high sensitivity) for more control electrode area; (2) the use of two vibration modes (in-phase and anti-phase) requires a complicated electronics readout scheme; (3) the frequency of operation of the prior art device is necessarily low to get high Q factor (<3 kHz), whereas we can use careful design to achieve the same acceleration measurement performance at higher natural frequencies (>10 kHz), resulting in 25× to 2500× reduced spurious vibration sensitivity for our device.

The prior art also includes: C. Comi, A. Corigliano, G. Langfelder, A. Longoni, A. Tocchio, and B. Simoni, "A new biaxial silicon resonant micro accelerometer," in 2011 *IEEE 24th International Conference on Micro Electro Mechanical Systems,* 2011, pp. 529-532. and Ralph Hopkins, Joseph Miola, Roy Setterlund, Bruce Dow, William Sawyer, "The Silicon Oscillating Accelerometer: A High-Performance MEMS Accelerometer for Precision Navigation and Strategic Guidance Applications", *The Draper Technology Digest,* Volume 10, CSDL-R-3005, 2006, pp. 4-13.

The aforementioned papers describe the typical approach to resonant MEMS accelerometers in which a mechanically-induced frequency shift is the main sensing mechanism. Our device uses an electrostatically-induced frequency shift mechanism originating in the nonlinearity of a capacitive transduction gap, which enables a much simpler mechanical structure to be used to sense accelerations.

The prior art additionally includes U.S. Pat. No. 7,337, 671B2: Capacitive microaccelerometers and fabrication methods" and Colibrys MS1000 accelerometer (see www.colibrys.com/product/ms1000-mems-accelerometer/).

The aforementioned patent and website describe "best-in-breed" static MEMS accelerometers. As mentioned above, the disclosed device has the advantage of more than 1000× higher dynamic range (defined as the ratio of the total input range divided by the smallest measurable signal) compared with static MEMS accelerometers.

The present invention is not obvious in light of the prior art for several reasons. Primarily, it turns out through some rather lengthy mathematics that if one attempts to create a single proof mass resonant accelerometer with a symmetric design, the sensitivity to acceleration will be zero for the perfectly symmetric structure. One solution to this is to introduce a second vibratory mode (as was done in the case of the Zotov/Trusov et al. prior art mentioned above), the frequency of which can be changed in response to acceleration picked up by the first vibratory mode. However, this is not necessarily ideal since it introduces complicated device designs and operation schemes and limits natural frequency ranges. A second solution would be to create non-uniform capacitive transduction gaps. However, this is undesirable for a few reasons: from a fabrication point of view, the critical dimensions of non-uniform transduction gaps are much harder to control during the deep reactive ion etching (DRIE) of silicon and from a device operation point of view, a non-symmetric device makes it harder to implement self-calibration techniques for the accelerometer (see US Provisional Patent Application No. 62/788,254 filed Jan. 4, 2019 and entitled "Continuous Online Self-Calibrating Resonant FM MicroElectroMechanical Systems (MEMS) Accelerometer" and its related Non-Provisional application Ser. No. 16/673,878 filed Nov. 4, 2019). Our solution, which we believe to be non-obvious, is to bias the device asymmetrically (meaning applying different DC voltages to the different capacitive gap transducers on either side of the device) to thereby displace the position of the proof mass asymmetrically relative to the capacitive gap transducers on either side of the device. This allows us to achieve high scale factor (frequency change per unit of acceleration) and at the same time preserves our ability to implement self-calibration through known bias voltage modification of the device. Without these innovations, it would not be possible to create the simple single proof mass resonant MEMS accelerometer disclosed herein. This is evidenced through the complicated design that was necessary in the closest prior art (Zotov/Trusov et al.).

A second point of non-obviousness is the satisfaction of a long-felt need for simultaneously high input range and high resolution, which is equivalent to a high dynamic range. As mentioned above, the disclosed device is expected to provide dynamic ranges in excess of $10^9$. This is in contrast to static accelerometers which are limited to dynamic ranges of $10^6$. Even the prior art resonant MEMS accelerometer of Zotov/Trusov et al. only has a claimed dynamic range of $10^7$ (which was only inferred, never proven experimentally).

A third point of non-obviousness is the placement of the accelerometer device 8 inside a vacuum sealed package to maintain the residual gas pressure levels <1 milliTorr using an activated getter material inside the vacuum package to capture any released gases over time. This uses proprietary HRL processes developed over time for the getter activation and vacuum sealing. The use of a vacuum package enables us to design high Q devices at high frequencies compared with prior art static and resonant MEMS accelerometers.

BRIEF DESCRIPTION OF THE INVENTION

In one aspect the present invention provides a resonant accelerometer comprising a proof mass, one or more springs connecting the proof mass to an anchor, and one or more capacitive transduction gaps (which may comprise a void between the movable proof mass and a corresponding fixed electrode), wherein the static displacement of the proof mass in response to acceleration applied to the anchor modifies the electrostatic stiffness imparted by one or more of the capacitive transduction gaps on the proof mass, resulting in a corresponding change in the resonance frequency of the combined electromechanical system.

Preferably, one or more of the capacitive transduction gaps is configured to actuate harmonic motion of the proof mass, the corresponding electrode of which is termed the drive electrode, and one or more of the capacitive transduction gaps is configured to sense the harmonic motion of the proof mass, the corresponding electrode of which is termed the sense electrode. In one embodiment this means that the sense electrode is connected to a sustaining amplifier circuit, which amplifies the displacement current that is generated when there is a DC voltage differential across the transduction gap (i.e., $V_P$ does not equal $V_B$ in FIG. 1) and the proof mass vibrates harmonically in the structure's primary resonance.

Preferably DC bias voltages are applied to the proof mass, the drive electrode(s), and the sense electrode(s), such that the proof mass is held at a polarization potential different than electrical ground, and the drive and sense electrodes are held at potentials ranging from electrical ground to the proof mass polarization potential, but are not necessarily equal to each other.

Preferably, the harmonic motional signal received by the sense electrode is fed back to the drive electrode to create a sustained oscillation at the harmonic frequency.

In another aspect, this invention comprises a resonant MEMS accelerometer structure batch fabricated on silicon-on-insulator (SOI) wafers (or other suitable material) using micromachining techniques in combination with an electronic circuit capable of driving the primary in-plane resonance mode of the accelerometer structure into sustained oscillations and frequency modulation (FM) readout of the up-converted inertial acceleration signal which is mapped onto FM sidebands of the primary resonance oscillation frequency. The accelerometer structure is preferably designed such that it has a high quality factor (Q>10,000) primary in-plane resonance mode with a natural frequency greater than 10 kHz. The disclosed resonant MEMS accelerometer may be sealed in a vacuum package at less than 1 milliTorr to preserve the high Q of the silicon structure. In contrast to static MEMS accelerometers, which are limited to dynamic ranges <$10^6$ by their amplitude modulation (AM) readout mechanism, the FM mechanism employed in the presently disclosed accelerometer allows dynamic ranges >$10^9$ to be obtained. Such a large dynamic range is useful to enable large input ranges (>±100 g to ±1000 g) while simultaneously preserving the ability to accurately resolve small inertial signals below 1 µg, where 1 g=9.81 m/s$^2$.

In other aspects, the present invention provides an accelerometer structure which provides a high precision, large FM scale factor and dynamic range (proof mass dimension, number of electrodes, size of electrode gaps, bump stops and spring stiffness) and a method of operation such that a simple, single mode, single mass device can be operated both statically (off resonance) to acquire the inertial acceleration force and harmonically (on resonance) so that the same structure can then be used as a FM readout mechanism of the inertial acceleration signal. We are exploiting the electrostatic spring stiffness nonlinearity of a variable capacitive gap to produce the desired FM tuning effect in response to acceleration.

BRIEF DESCRIPTION OF THE DRAWINGS

FIGS. 1(*a*) and 1(*b*) depict analog and digital circuits which may be utilized with the new accelerometer disclosed herein.

In FIG. 3(a) contact surfaces are both flat, while in FIG. 3(b) one of the contact surfaces has curved bumps. In FIG. 3(c) one of the contact surfaces has triangular bumps, while in FIG. 3(d) both of the contact surfaces have aligned curved bumps.

FIG. 8 depicts a design tradeoff summary. Increasing the frequency trades VRW for higher dynamic range. An upper frequency limit is set by scale factor $\Gamma$ and VRW requirements.

FIGS. 10(a)-10(d) depict one possible fabrication sequence for making an embodiment of disclosed silicon (Si) MEMS accelerometer.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Figure 1:
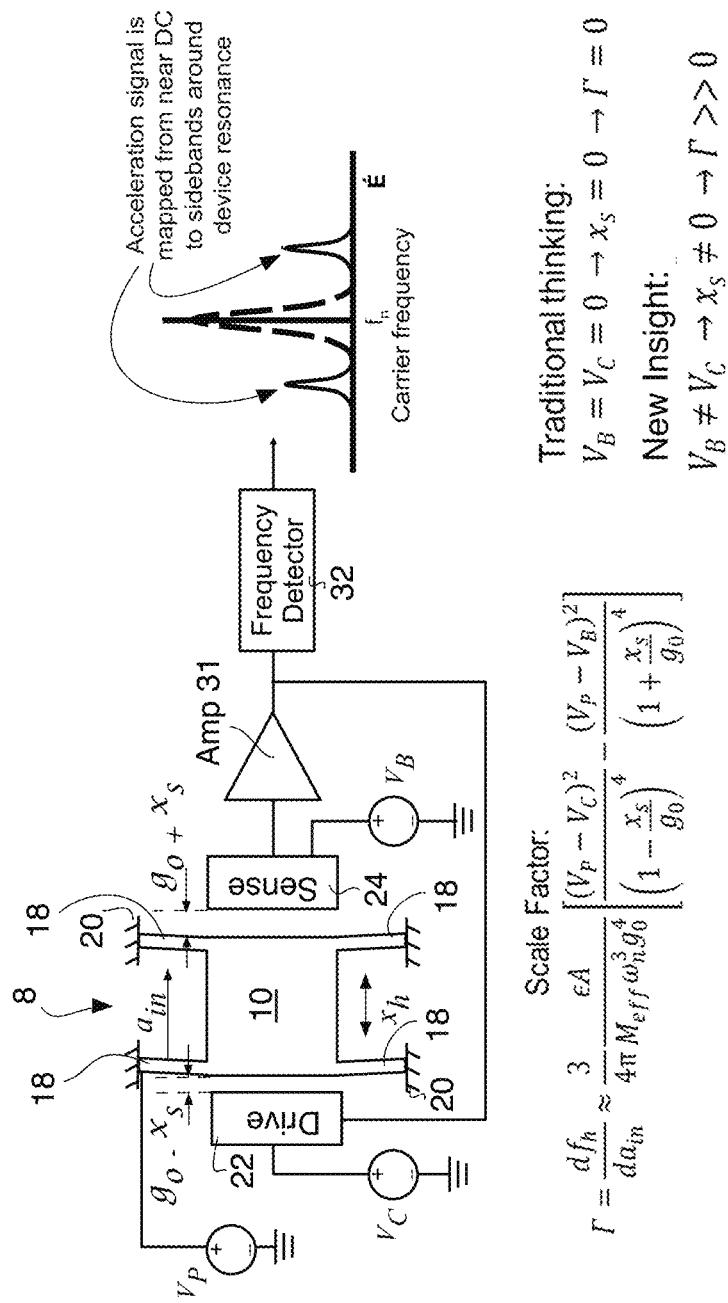
FIG. 1 depicts the basic concept of operation of the new accelerometer disclosed herein which provides a mechanically simple resonant accelerometer with high scale factor, Γ.

1. Concepts Underlying the Operation of the Resonant MEMS Accelerometer Disclosed Herein A new resonant MEMS accelerometer device 8 and method of operation has the potential to achieve navigational grade performance (sub-micro-g) and at the same time accept high input ranges (up to ±1000 g and beyond). FIG. 1 shows the concept of operation for the new resonant MEMS accelerometer device 8, where acceleration is mapped from near DC to a signal contained in the sidebands around the device's resonance frequency (see the frequency domain graph on the righthand side of FIG. 1). In other words, acceleration is detected through change of the device's natural frequency and can be read out in the time domain using a frequency detector circuit 32 (digital or analog). Therefore, the scale factor $\Gamma$ or the sensitivity is an important parameter to optimize through design and operation of the disclosed resonant MEMS accelerometer. FIG. 1 shows an equation for calculating scale factor $\Gamma$ which is reproduced below:

$$\text{Scale Factor:} \qquad \Gamma = \frac{df_n}{da_{in}} = \frac{3}{4\pi} \frac{\epsilon A}{M_{eff} \omega_n^3 g_o^4} \left[ \frac{(V_P - V_C)^2}{\left(1 - \frac{x_s}{g_o}\right)^4} - \frac{(V_P - V_B)^2}{\left(1 - \frac{x_s}{g_o}\right)^4} \right] \qquad \text{Eqn. (1)}$$

where $f_h$ is the frequency of the harmonic oscillation of the composite electromechanical mass-spring system (in Hz), $a_{in}$ is the input acceleration applied to the package or support frame of the accelerometer device 8 (in g or m/s²), $\epsilon$ is the dielectric constant of the vacuum-filled capacitive gaps used for electrostatic transduction of the motion of the proof mass (typically $\epsilon = \epsilon_0 = 8.854 \times 10^{-12}$ F/m), A is the total area of the capacitive gaps (in m²), $M_{eff}$ is the effective modal mass of the accelerometer device 8 (in kg, typically roughly the same as the proof mass), $\omega_n$ is the natural angular frequency of the proof mass oscillation in the absence of acceleration or applied tuning voltages ($V_B = V_C = 0$) (in rad/s), $g_o$ is the dimension of the capacitive gap (in m, but typically expressed in μm), $V_P$ is the DC polarization voltage applied to the proof mass or body of the accelerometer which energizes the capacitive gaps to allow transduction of signals from the electrical to the mechanical domain and vice versa (in V), $V_B$ and $V_C$ are the DC tuning voltages applied to the Sense and Drive electrodes 24 and 22, respectively (in V), and $x_s$ is the static displacement of the proof mass in response to an applied external acceleration $a_{in}$ (in m, but typically expressed in μm or nm).

In this context, the word "optimize" means make as big as possible, while also considering other tradeoffs and the practical design space.

Figures 2A, 2B:
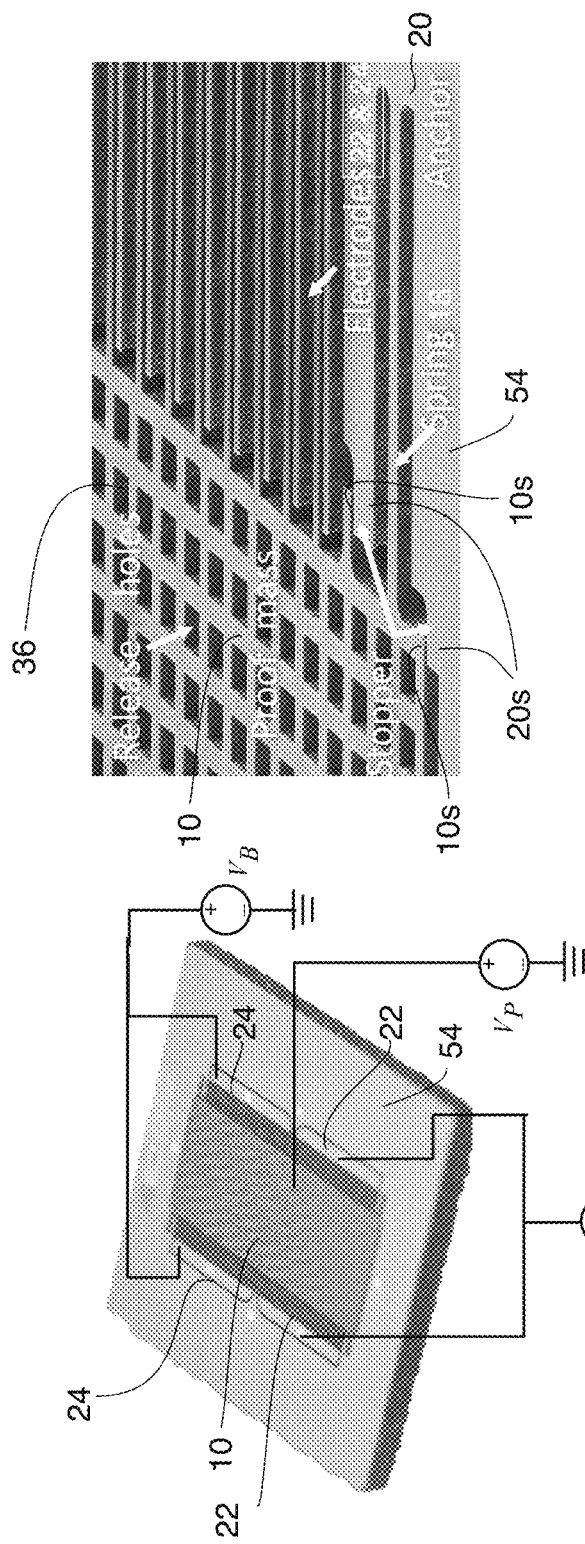
FIG. 2(*a*) depicts an overview or schematic view of an embodiment of a silicon (Si) MEMS accelerometer design in accordance with the present invention showing locations of applied DC bias voltages, while FIG. 2(*b*) depicts zoom-in view of a lower right corner of an embodiment of the present invention showing proof mass, release holes, electrodes, springs, stopper, and anchor locations.
Figure 3A:
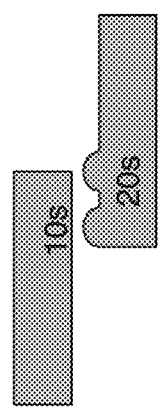
FIGS. 3(a)-3(d) depict potential variations of stopper design.
Figure 3B:
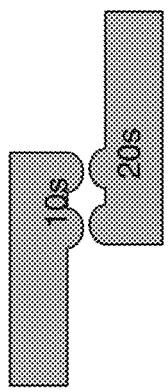
Figure 3C:
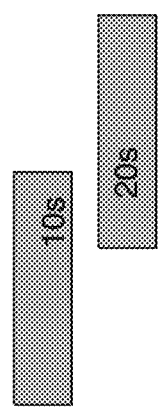
Figure 3D:
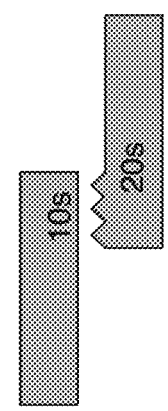

As is depicted in greater detail by FIG. 2(b) the accelerometer device 8 has a proof mass 10, one or more (preferably finger-like) springs 18 connecting the proof mass 10 with an anchor points 20 to dispose the proof mass 10 at an "at rest" position relative to the anchor points 20 (the points of attachment of the suspended proof mass 10 to substrate 54 which may surround the proof mass 10 as is depicted by FIG. 2(a)), and one or more drive electrodes 22 and sense electrodes 24 (a single drive and a single sense electrode is shown in FIG. 1 but as can be seen with reference to FIG. 2(b), a plurality of electrodes 22, 24 may occur in the final accelerometer design). Various DC biases (discussed below) are applied to the structure as shown to energize the capacitive transduction gaps ($g_o$) for the purpose of transducing AC electrical voltages into mechanical force and mechanical motion into AC electrical currents.

Figure 9A:
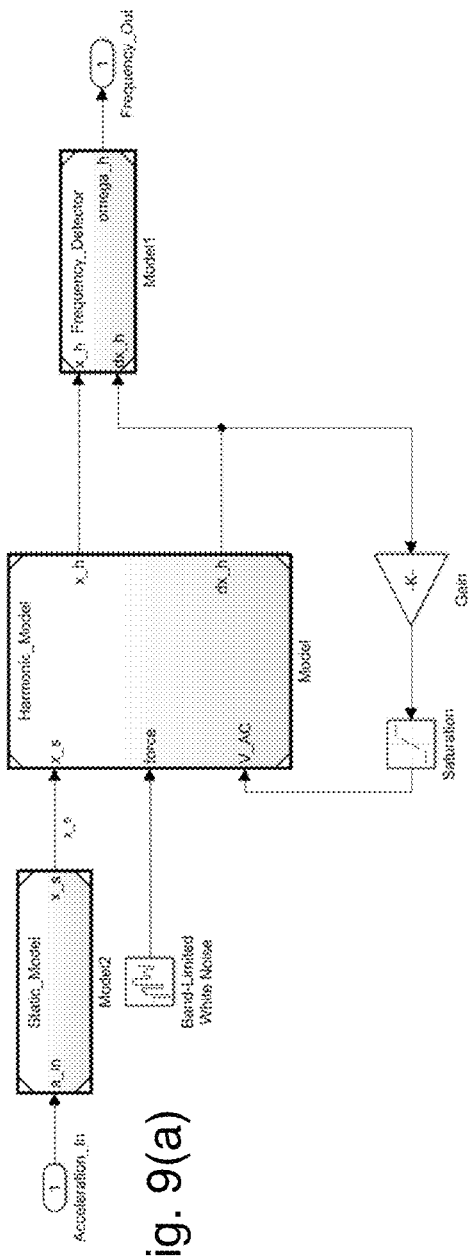
FIG. 9(a) is a Simulink-Based Subsystem Model and FIG. 9(b) shows the result of static displacement $x_{static}$ and harmonic frequency behavior as input acceleration ($a_{in}$) varies.
Figure 9B:
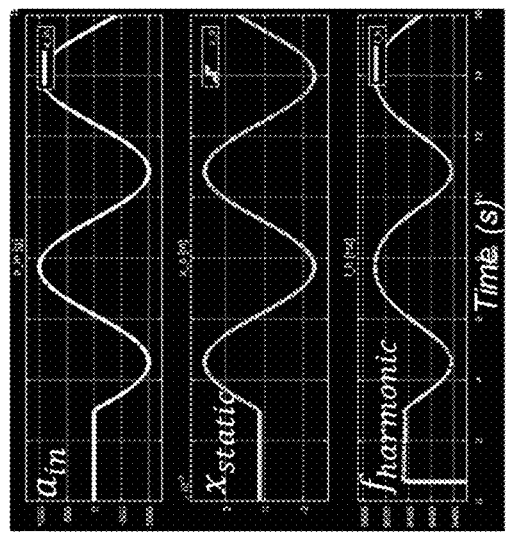

A sustaining amplifier (labelled "Amp 31" in FIG. 1), or an equivalent digital circuit or apparatus, closes the oscillation loop around the accelerometer device 8, allowing the proof mass 10 to vibrate with mechanical amplitude $x_h$ (defined in micrometers) at the system's natural harmonic frequency $f_h$ (labeled $f_{harmonic}$ on FIG. 9(b)). The harmonic frequency of this oscillation can be found from the following equation:

$$f_h = \frac{1}{2\pi}\sqrt{\frac{\left(k_{eff} - \frac{\varepsilon A}{g_o^3}\left(\frac{(V_P - V_C)^2}{\left(1 - \frac{x_s}{g_o}\right)^3} + \frac{(V_P - V_B)^2}{\left(1 + \frac{x_s}{g_o}\right)^3}\right)\right)}{M_{eff}}} \quad \text{Eqn. (2)}$$

where $k_{eff}$ is the effective stiffness (in N/m) in the absence of DC bias voltages, $M_{eff}$ is the effective proof mass (in kg), $\varepsilon$ is the dielectric permittivity of the capacitive transduction gap (typically equal to the vacuum permittivity $\varepsilon_0$=8.854E–12 F/m unless the gap is partially filled with some other dielectric material), A is the area of the drive and sense electrodes (assumed to be equal to produce a symmetric accelerometer but could be generalized to have unequal areas between drive and sense electrodes), $g_0$ is the nominal capacitive transduction gap width (in micrometers), $V_P$ is the DC polarization voltage applied to the accelerometer proof mass, $V_B$ and $V_C$ are DC bias voltages applied to the sense and drive electrodes, respectively, and $x_s$ (labeled $x_{static}$ on FIG. 9(b) is the static displacement (in micrometers) of the accelerometer in response to externally applied acceleration, $a_{in}$ (in meters per second squared (m/s$^2$ or standard gravities (g)). $x_s$ is related to the input acceleration by $$x_s \approx \frac{-a_{in}}{(2\pi f_n)^2},$$

where $f_n$ is $f_h$ from the above equation when $x_s$=0. Therefore, an applied acceleration causes a change in the static displacement $x_s$ (in micrometers) of the proof mass, which is detected as a change in the harmonic frequency of oscillation $f_h$.

Since $f_h$ is now a function of the applied acceleration $a_{in}$ (applied to accelerometer device 8), in the frequency domain, the accelerometer behaves analogously to a frequency modulation (FM) radio transmitter. The inertial information contained in the time domain signal $a_{in}(t)$ exists in a band of frequencies extending from DC up to a certain maximum frequency of the inertial acceleration content contained in $a_{in}$. This is termed the inertial bandwidth (IBW) of $a_{in}$. Since $f_h$>>IBW, the modulation action of $a_{in}$ on $f_h$ results in the acceleration information becoming contained in the typical FM sidebands on each side of the carrier frequency of the modulated signal. This situation is depicted on the right hand side of FIG. 1, where the frequency content of the $f_h(t)$ signal is analyzed in the frequency domain, showing the main carrier frequency at $f_n$ and the two sideband lobes indicating the presence of acceleration information within +/−the IBW on either side of the carrier. In particular, FIG. 1 depicts the case where there is a particularly strong input acceleration at a single frequency, which results in sideband lobes on either side of the carrier offset from $f_n$ by the particular input acceleration frequency. In the general case, the acceleration sidebands would mirror the spectral content of the general time dependent signal $a_{in}(t)$, which would result in an effective smearing of the sideband lobes from 0 offset from the carrier (representing acceleration spectral content at DC) up to the IBW on either side of the carrier (representing the maximum frequency content of $a_{in}(t)$). In the case of no input acceleration, the acceleration sidebands would disappear completely from the spectral content of $f_h(t)$, and only the carrier would be present at $f_n$. Hence, a function of the disclosed resonant MEMS accelerometer device 8 is to modulate its harmonic frequency in response to applied acceleration, the net result of which is a mapping of the near DC acceleration spectral information into sidebands surrounding the carrier at $f_n$. The consequence of this effect is that the resulting modulated harmonic frequency should be detected in order to extract the acceleration information from the disclosed accelerometer device 8.

Figure 1A:
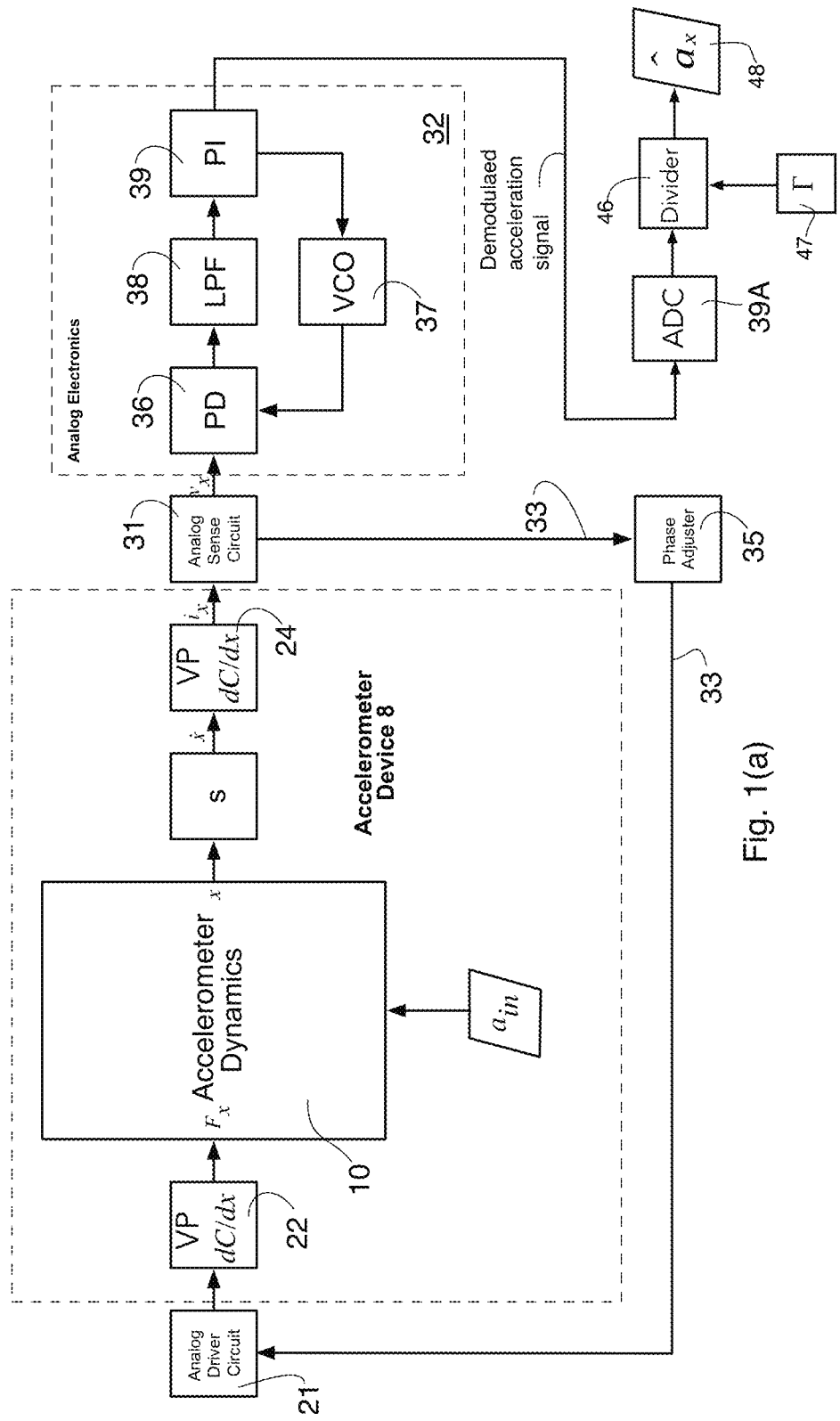

The sustaining amplifier (labelled "Amp 31" in FIG. 1) may utilize a feedback circuit formed, for example with analog techniques (see FIG. 1(a)), using, for example, a multi-stage amplifier design where a first stage is a transimpedance amplifier (TIA) to convert the accelerometer device's sense current (from sense electrode 24) into a voltage and a second stage a buffer amplifier to drive the drive electrode 22. An analog implementation is depicted in greater detail by FIG. 1(a). The accelerometer device 8 comprises a drive electrode 22 which transduces the driving voltage signal received from the analog driver circuit 21 into an electrostatic force applied to the fingers 18 protruding from accelerometer proof mass 10. Fingers 18 act as springs 18 allowing the proof mass to move relative to a substrate or other body of material 20 which preferably surrounds or is disposed adjacent the proof mass 10. Depending on the nature of the voltage signal received from the analog driver circuit 21, the force exerted on the accelerometer resonator's proof mass 10 may be either DC, which causes a static displacement of the proof mass 10, AC, which causes a harmonic displacement of the proof mass 10, or a combination both DC and AC. The displacement x of the accelerometer resonator's proof mass 10 is naturally differentiated inside the accelerometer device 8 to produce a signal $\dot{x}$ proportional to the velocity of the proof mass 10. The proof mass velocity signal $\dot{x}$ is received by the sense electrode 24 where it is transduced to an electrical current proportional to the velocity of the proof mass 10. This signal is amplified and converted from an electrical current to an electrical voltage by a first stage of the analog sense circuit 31, which preferably comprises a transimpedance amplifier TIA as mentioned above. The analog sense circuit 31 may also include other analog circuitry including additional voltage gain stages, buffer amplifier stages, and/or signal filtering stages. At the analog sense circuit 31, the signal chain branches. One branch is the feedback path 33 which is used to sustain the harmonic oscillation of the accelerometer device 8. The other branch is sent to the frequency detector circuit 32, which may be implemented as a phase-locked loop (PLL) based FM demodulator. In the feedback path 33, an optional phase adjuster circuit 35 may be employed to ensure that a proper phase condition is satisfied to allow stable and sustained harmonic oscillations. The feedback path 33 delivers the signal to the analog driver circuit 21, which preferably comprises a driver amplifier and any desirable filtering circuitry. The frequency detector 32 may comprise a phase detector (PD) 36 which compares the incoming signal to a reference signal received from a voltage-controlled oscillator (VCO) 37. The phase detector 36 produces an error signal proportional to the phase difference between the accelerometer signal and the VCO signal. This signal is filtered by a low-pass filter (LPF) 38 to remove any high order harmonics, and is subsequently fed as the input to a proportional-integral (PI) controller 39, although other controller types than PI may be used. The job of PI controller 39 is to adjust the VCO 37 such that the phase error between the incoming accelerometer signal and the VCO output is zero. When this occurs, the loop contained within the frequency detector 32 is said to be locked, meaning that the frequency and phase of the accelerometer signal received from the analog sense circuit 31 matches the frequency and phase of the VCO 37 output. After the frequency detector 32 achieves phase and frequency lock, the PI controller 39 output, which is the tuning voltage ax used to control the frequency of VCO 37, is therefore an indication of the instantaneous frequency of VCO 37, and therefore proportional to the strength of the acceleration $a_{in}$ being applied (sensed by) to the accelerometer device 8, which changes its resonance frequency as explained previously. Thus, the output of the PI controller 39 can be interpreted as the measured acceleration $\hat{a}_x$ once the scale factor and bias calibration have been applied. This may be done in the digital domain using a ADC 39A coupled to the output of PI controller 39, the ADC 39A having its output couple to a digital divider 46 for dividing the output of ADC 39A by the scale factor $\Gamma$ 47 in order to arrive at the measured value of the acceleration $\hat{a}_x$. Of course, the divider 46 could be implemented as an analog divider in which case it would form part of the analog circuitry 32 and occur between the PI controller 39 and the ADC 39A.

Figure 1B:
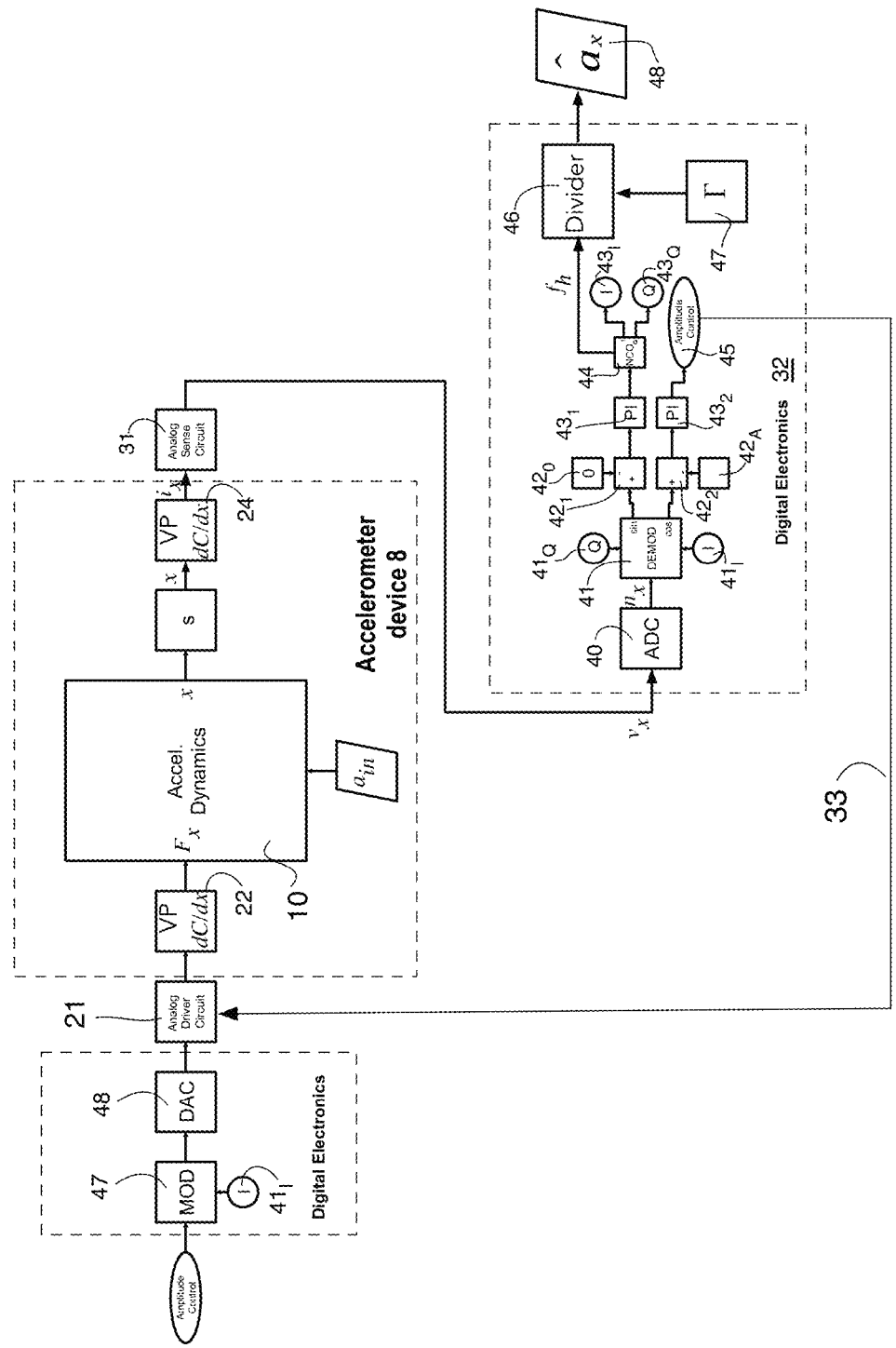

A digital implementation is depicted by FIG. 1(b). The functionality of the analog driver circuit 21, the accelerometer device 8 and its internals, and the analog sense circuit were previously explained in FIG. 1(a) and serve the same functionality in the digital implementation. In the digital implementation, the output of the analog sense circuit 31 is received by an analog-to-digital converter (ADC) 40, whose function is to convert the voltage signal to a digitally coded signal $n_x$ consisting of N-bit digital words generated sequentially at the sampling rate of the ADC 40. The digital signal $n_x$ is received by demodulator 41, which compares the incoming signal against an in-phase reference signal $41_I$ and a quadrature-phase reference signal $41_Q$, producing the demodulated (carrier removed, i.e., AC→DC) in-phase and quadrature components of the acceleration signal. The quadrature component is compared with a quadrature setpoint $42_Q$ of 0 using a first differencer $42_1$. This produces a phase error signal which is received by a first PI controller $43_1$. The first PI controller $43_1$ adjusts the phase of numerically controlled oscillator (NCO) 44, which produces an in-phase reference signal $44_I$ and the quadrature-phase reference signal $44_Q$. In this manner, a phase-locked loop is formed in the quadrature phase branch using elements 41, $41_Q$, $42_1$, $42_Q$, $43_1$, and 44. When this loop is in phase and frequency lock with the accelerometer output signal originating from the analog sense circuit 31, the harmonic frequency $f_h$ 44 is divided by the scale factor $\Gamma$ allowing the measured acceleration $\hat{a}_x$ to be read out digitally at numeral 48 ($f_h$ is related to the measured acceleration $\hat{a}_x$ by the scale factor $\Gamma$ ... see Eqn. (1) above). The in-phase component of the demodulator 41 output is compared with an amplitude setpoint $42_A$ using a second differencer $42_2$. This produces an amplitude error signal which is received by a second PI controller $43_2$ whose output is the amplitude control loop variable 45. The amplitude control loop variable 45 is fed back to the drive side of the accelerometer device 8 by feedback path 33, which is received by a modulator 47 which modulates the amplitude control signal on top of the in-phase reference signal $41_I$ (i.e., DC→AC). The output of the modulator 47 is received by a digital-to-analog converter (DAC) 48, which takes the digital word representing the desired AC drive signal and converts it to a voltage signal. This voltage signal is applied to the analog driver circuit 21, where it is ultimately converted to a driving force on the accelerometer resonator's proof mass 10.

The mass and stiffness are referred to above as being "effective" stiffness and mass because they are determined by a weighted average over the distributed vibratory motion into a single equivalent or effective lumped stiffness or mass element for use in a single degree-of-freedom model of the system.

A larger scale factor $\Gamma$ means the term on the right subtracted from the effective stiffness in the frequency equation for $f_h$ above becomes relatively larger compared with the effective stiffness itself. That is, a higher scale factor causes the frequency "tuning" stiffness to become also larger, which allows a greater change of the frequency in response to acceleration. The origin of the frequency tuning stiffness is the nonlinearity of the electrostatic spring force in response to a change in the static electrostatic gap between the proof mass and one or more fixed electrodes. When a DC voltage is applied across a given electrostatic gap, the electrostatic force that is generated on the harmonically oscillating proof mass is negatively proportional to the displacement of the proof mass (the negative sign is a consequence of the attractive nature between two plates of a charged electrostatic gap), which consequently appears as a negative spring to the harmonic system analogous to the well-known Hooke's law for a spring (F=kx). However, this linear approximation is only valid for small harmonic displacements of the proof mass. If the proof mass is displaced by a large amount, such as the static response to acceleration or purposeful changes in the proof mass position through control of DC voltages, the electrostatic force is actually proportional to the inverse of the square of the gap between the two plates of the electrostatic transducer. This significantly nonlinear sensitivity of the electrostatic force to the static gap results in a change of the effective linear spring coefficient for small harmonic oscillations of the proof mass, resulting in tuning of the harmonic oscillation frequency. Without the nonlinearity of the electrostatic force with respect to static gap, there would be no frequency tuning effect, and the frequency could not be modulated to sense acceleration according to embodiments of the current invention. The derivation of the nonlinearity of the electrostatic transducer with respect to static gap and the consequence on the harmonic frequency of oscillation is found in the accompanying Appendix A.

The scale factor equation from FIG. 1 and the formula for $f_h$ above contain a lot of the same parameters. The reader will note that there are 'interesting' similarities as well as 'interesting' differences. The similarities arise because the acceleration sensitivity or scale factor $\Gamma$ is related to the derivative of the harmonic frequency $f_h$ with respect to acceleration. A derivation of these formulas and further explanations of the variables can be found in accompanying Appendix A.

The accelerometer device 8 shown in the figures can be considered typical of many MEMS devices (but not necessarily MEMS accelerometers) in terms of how it may be fabricated . . . . FIGS. 10(*a*)-10(*d*) and the related text provide an explanation of one possible fabrication sequence. In a typical prior art MEMS application, the proof mass is biased with DC bias voltage V" the sense electrode is DC grounded, and the drive electrode is DC grounded while an AC driving voltage is applied to the drive electrode to excite harmonic motion of the proof mass ($x_h$). In other words, in the prior art, the DC bias voltages $V_B$ and $V_C$ are zero for sense and drive electrodes, respectively. Hence, no static displacement $x_s$ results since the proof mass is balanced by drive and sense electrodes. From the scale factor equation in FIG. 1, if $V_B=V_C=0$ and $x_s=0$, then the scale factor or sensitivity to acceleration is zero. See, for example, B. Kim, M. Akgul, Y. Lin, W. Li, Z. Ren, and C. T.-Nguyen, "Acceleration sensitivity of small-gap capacitive micromechanical resonator oscillators," in 2010 *IEEE International Frequency Control Symposium*, 2010, pp. 273-278.

The above is very desirable if the application of the MEMS device is a resonator for frequency or timing applications (the device rejects unwanted shifts in frequency due to acceleration). However, if one wants to turn the simple single proof mass MEMS device into a resonant accelerometer (with a high scale factor Γ or frequency sensitivity of its oscillation frequency to acceleration), a frequency sensitivity of zero to acceleration presents a fundamental problem. The new approach taught herein to solve this problem is to introduce unequal DC bias voltages $V_B$ and $V_C$, which also pre-displace the proof mass from is an "at rest" position (where $x_s=0$) to a displaced position (e.g., $x_s\neq0$), to enable the possibility of large scale factors Γ, and making a mechanically simple resonant MEMS accelerometer possible with a single proof mass. Our target for the scale factor Γ was 1 Hz/g. Realistically, the scale factor Γ should preferably fall in the range 0.1 to 10 Hz/g, depending on the accelerometer design. $x_s$ can be no larger than $g_o$ to avoid pull-in closing of the electrostatic gap.

An embodiment of this new accelerometer device 8 design is shown in FIG. 2(*a*) which provides an overview of the accelerometer device 8 consisting of a center proof mass 10 and four sets of electrodes (two drive electrodes 22 and two sense electrodes 24) with their own respective DC bias voltages ($V_P$, $V_C$, and $V_B$) applied thereto. Springs 18 are omitted from this view for clarity of presentation. An enlarged view of the lower right corner of an embodiment of the device of FIG. 2(*a*) is shown in FIG. 2(*b*). Center proof mass 10 with release holes 36 (for releasing the proof mass 10 from the handle Si wafer 54 (see also FIG. 10), so the proof mass 10 is free to move relative to the anchor frame 20 (in this embodiment the wafer 54 functions as the anchor frame 20) by the finger-like springs 18. The stopper 20*s* is part of the anchor frame 20, and it is used to prevent the proof mass 10 from shorting with the drive electrodes 22 and with the sense electrodes 24 during high acceleration. Careful design of the springs 18 and the stoppers 20*s* is important in order to achieve a desirable high dynamic range. Instead of using stopper 20*s* a dielectric could be deposited on the electrodes 22 and/or 24, but that would likely be a less desirable solution to the shorting issue. An important feature of the stopper 20*s* is low stiction (minimum contact area when the proof mass impacts on the stopper at numeral 10*s*) to allow the proof mass 10 to release after making contact with stopper 20*s*. It is also desirable that the proof mass 10 and stopper 20*s* have the same electrical potential to prevent electrical arcing and shorting. Several examples of potential stopper designs are shown in FIGS. 3(*a*)-3(*d*). FIG. 3(*a*) is a sketch of a portion of FIG. 2(*b*) showing stopper contact surfaces 10*s* and 20*s* which are both flat in that embodiment. FIG. 3(*b*) shows one of the contact surfaces having curved bumps 20*b*, FIG. 3(*c*) shows one of the contact surfaces having triangular bumps 20*t*, and FIG. 3(*d*) is an example of both of the contact surfaces have aligned curved bumps 10*b* & 20*b*. The bumps, whether rounded or triangular or otherwise, may occur on either one or both of the contacting surfaces 10*s* and 20*s*, and may take other shapes than those shown here.

2. Quality Factor (Q-Factor) Enhancement of Resolution

Figure 4:
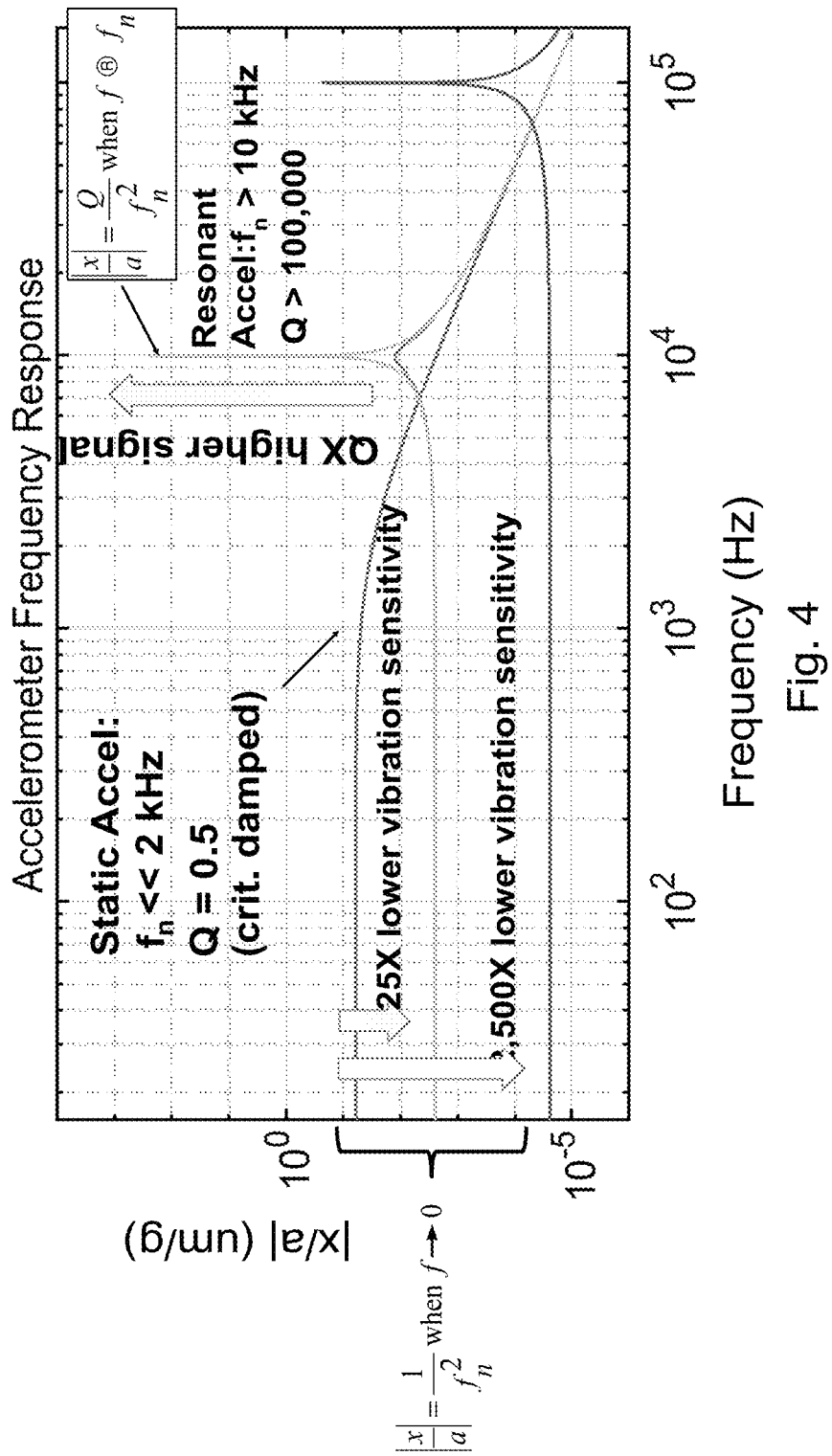
FIG. 4 depicts accelerometer frequency response for static and resonant accelerometers.

FIG. 4 is a graph showing the frequency response of our the accelerometer design and helps explain why a high frequency resonant accelerometer (>10 kHz) is better than static or low frequency resonant accelerometer (<<2 kHz). FIG. 4 does not represent any specific embodiment of the disclosed accelerometer, but rather shows what the transfer function would be with certain parameter values. A high frequency resonant accelerometer eliminates unwanted vibration pick up by at least 25× while retaining the desired inertial signal (this effect scales with natural frequency squared). The near DC inertial signal is up-converted onto sidebands at the natural frequency as shown in FIG. 1. Hence, a resonant accelerometer can accurately detect the desired acceleration without being affected by unwanted vibration. When the resonance frequency approaches to zero, the normalized response amplitude |x/a| is propositional to $1/f_n^2$, where x is amplitude and a is input acceleration. Reduction of vibration sensitivity can be achieved by increasing the resonance frequency of the accelerometer device: 25× reduction for from 2 kHz to 10 kHz, and 2,500× reduction for from 2 kHz to 100 kHz. When the driving frequency is approaching to resonant frequency, the signal amplitude will gain Q times of amplification, which results √Q lower acceleration noise (velocity random walk (VRW), discussed next). It should be noted that, the accelerometer device 8 does the up-conversion itself. One way to think about it is the circuit feeds the accelerometer device 8 a clean sinusoidal signal at its resonance frequency, the accelerometer device 8 takes that clean sinusoidal signal and FM modulates it proportionally to the applied acceleration, and then the readout circuit is responsible for FM demodulating the acceleration signal out of the received signal while generating a clean reference to apply to the drive circuit.

3. Noise Model: Velocity Random Walk (VRW)

Figure 5:
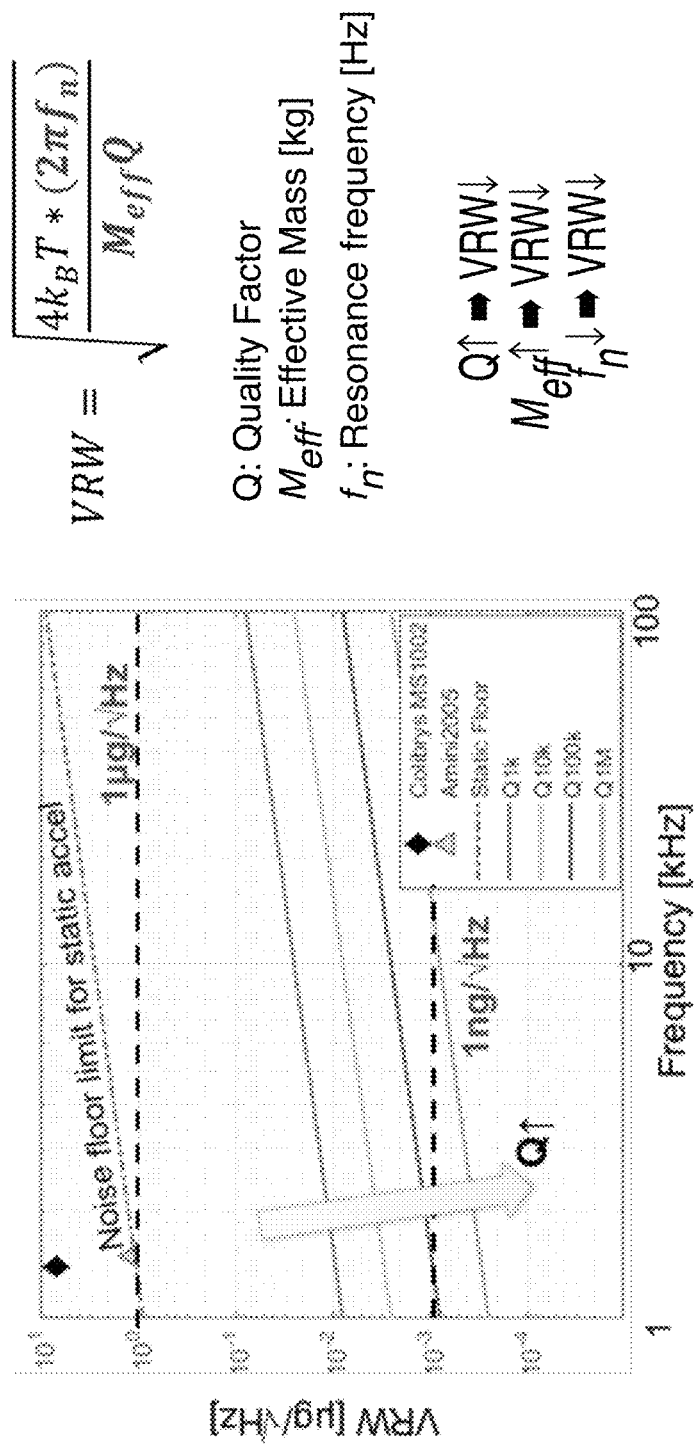
FIG. 5 is a plot of Velocity random walk (VRW) as a function of resonance frequency. Reduction of VRW can be achieved by increase of Q-factor, increase of effective mass ($M_{eff}$), and/or decrease of resonance frequency ($f_n$).
Figure 6:
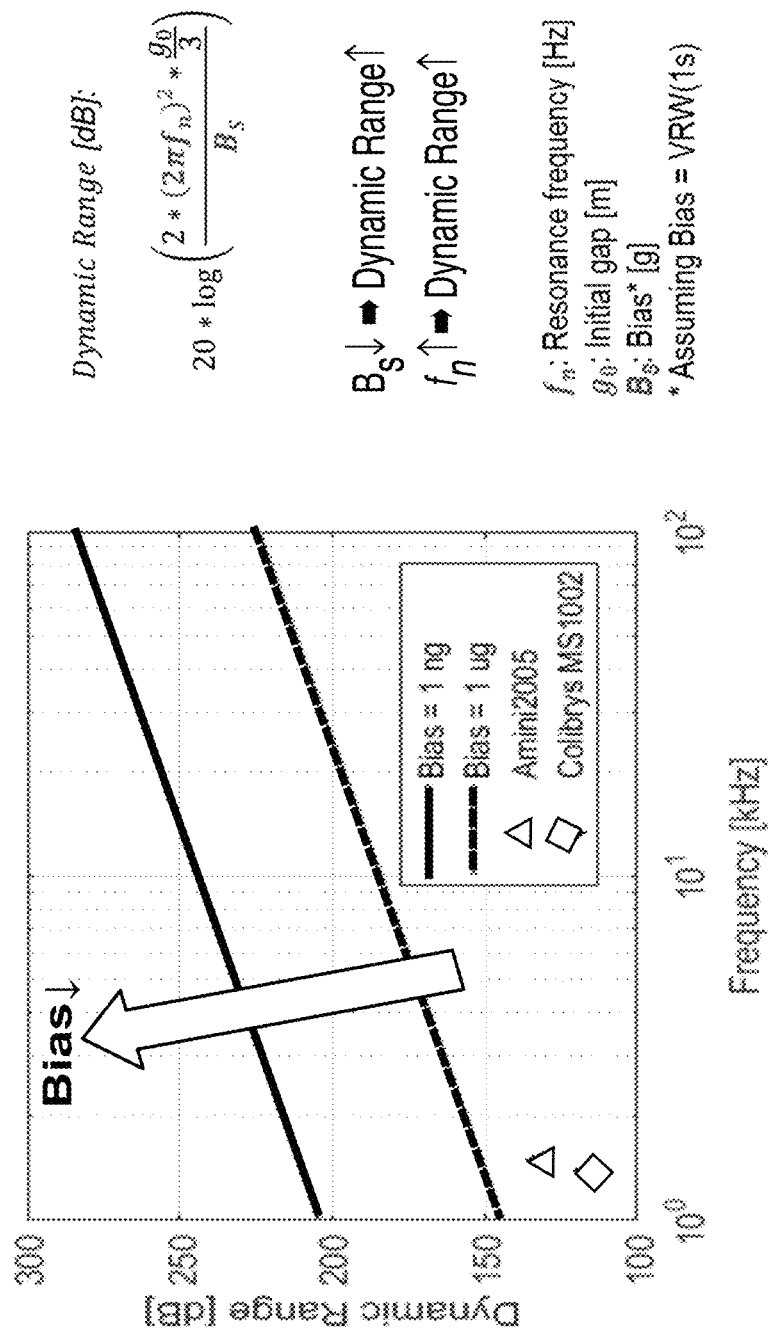
FIG. 6 is plot of dynamic range of the accelerometer as a function of resonance frequency. High dynamic range can be achieved by improvement of bias stability (Bs) and/or increase of resonance frequency ($f_n$).

One of the key parameters for a high performance accelerometer is a low bias noise floor, which defines the precision or resolution of the smallest change in acceleration that can be reliably detected. Velocity Random Walk (VRW) is a measure for how long one will need to integrate the signal to get to the bias floor. Lower VRW means shorter integration times for the same accelerometer performance, but lower VRW alone does not guarantee lower bias floor. A low VRW is desirable to reach the bias floor in a reasonable integration time during operation and preferably the VRW is below 10 micro-g/sqrt(Hz) to compete with the best available COTS static accelerometers. However, our target is for the VRW to be well below 1 micro-g/sqrt(Hz), but this also depends on the ultimate application being addressed. FIG. 5 shows a comparison between SOA static MEMS accelerometers and the resonant accelerometer disclosed herein. In the plot, the black diamond is for SOA commercial static MEMS accelerometer from Colibrys, model MS1002, the black triangle is SOA academic static MEMS accelerometer, and dashed line neat the top of the plot shows the noise floor limit for the static accelerometer as the performance barrier. A static accelerometer can achieve 1 µg/√Hz at frequency <2 kHz, but it is susceptible to unwanted vibration during operation, reducing measurement accuracy. VRW is a function of quality factor Q, effective mass $M_{eff}$, and resonant frequency $f_n$. Reduction of VRW can be achieved by increasing the quality factor Q, increasing the effective mass ($M_{eff}$), and decreasing the resonance frequency ($f_n$). The plot in FIG. 5 shows the effect of Q-factor and resonance frequency. Increasing Q-factor to 1 Million (1,000,000) with resonant frequency of 10 kHz, VRW can be reduced to <1 ng/√Hz, which gives 1000× headroom for environmental compensation to achieve an accelerometer VRW of <1 µg/√Hz during operation in the field.

4. Noise Model: Dynamic Range

Precision is important for measurement accuracy, but dynamic range is also critical to determine whether an accelerometer is suitable for field operation. The presently disclosed accelerometer can achieve a dynamic range >180 dB (1E9) by increasing resonance frequency or improving bias stability, enabling large motion detection with high accuracy. A dynamic range of 120 dB (1E6) with bias of 1 µg translates into input range of ±1 g, which is approximately the limit for static accelerometers.

5. Noise Model: Scale Factor

Figure 7:
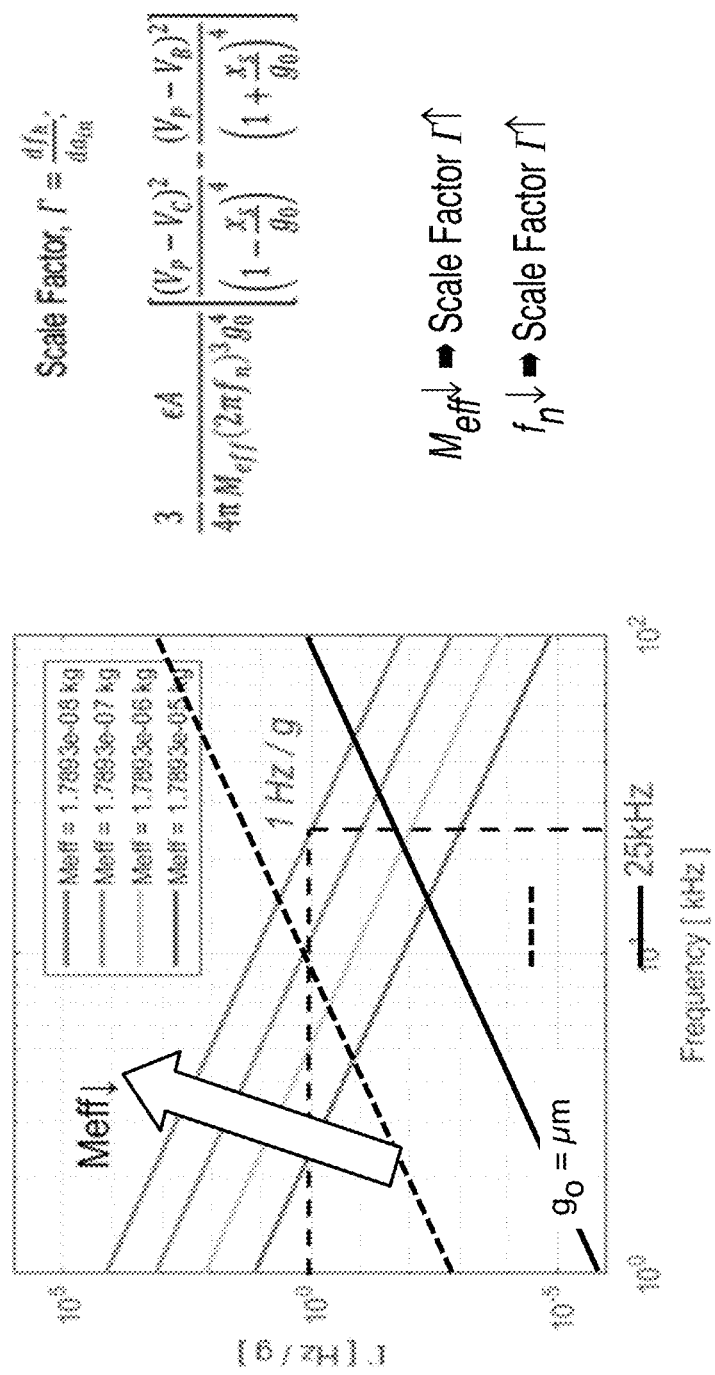
FIG. 7 is plot of scale factor as a function of resonance frequency. Large scale factor ($\Gamma$) can be achieved by reduction of effective mass ($M_{eff}$) and/or reduction of resonance frequency ($f_n$).

The next important parameter for accelerometer performance is scale factor (or sensitivity) for detection. For a resonant accelerometer, the scale factor is in units of Hz/g, showing how much frequency change corresponds to a change of the input acceleration state. The higher scale factor, the easier a small acceleration is to detect, and the signal to noise ratio will be higher. The equation in FIG. 7 shows that scale factor depends on many parameters (geometric and electrical). In the above Concept of Operation section, the relationship between scale factor and electrical bias voltages was explained. This Scale Factor section will focus on the accelerometer device's geometric parameters (effective mass $M_{eff}$ and resonant frequency $f_n$) that can dramatically affect the scale factor without hitting fabrication limits on the gap dimensions and area ($g_0$ and A). Scale factors of >1 Hz/g can be achieved by reducing effective mass to order of 1E−8 kg, setting the upper limit of the resonant frequency to be 25 kHz.

6. Noise Model: Design Tradeoff Summary

Optimizing overall accelerometer performance requires deep understanding of the above design tradeoffs. FIG. 8 summarizes the design tradeoff equations and shows that trading VRW for higher dynamic range can be achieved by increasing resonance frequency, and that the upper frequency limit is set by scale factor and VRW requirements.

7. Simulink-Based Subsystem Model and Results

A Simulink-based subsystem model is shown in FIG. 9(a) which implements the dynamical equations (found in accompanying Appendix B) governing the resonant accelerometer for validation of the above design tradeoffs. The acceleration signal is an input into the model, from which the static displacement is computed in the Static Model block, after which the static displacement is applied to the harmonic response equation implemented in the Harmonic Model block to solve the new harmonic oscillation frequency, which is fed back to the harmonic model to create a closed loop for stable oscillation. FIG. 9(b) shows that the model implements the expected behavior of static displacement $x_{static}$ and harmonic frequency $f_{harmonic}$ as the input acceleration varies.

Additional specific forces (reduced by the effective mass) can be added to the right hand side of the second and third equations in Appendix B to account for noise effects, such as the thermomechanical noise force responsible for part of the contribution to the Velocity Random Walk (VRW) of the accelerometer. The thermomechanical noise force is implemented by the Band-Limited White Noise block in FIG. 9(a).

8. A Possible Fabrication Sequence

FIGS. 10(a)-10(d) depict one possible fabrication sequence of making a an embodiment of disclosed silicon (Si) MEMS accelerometer device 8 which utilizes a Si handle wafer of layer 50. A layer 52 of $SiO_2$ is provided as a release layer and a layer 54 of Si is formed on the release layer 52. The MEMS accelerometer is then defined in layer 54 as depicted by FIG. 10(d) by first patterning some Au on layer 34 (for sensor and resonator body 10 contacts . . . see FIG. 10(b)) which layer 53 is thereafter etched (including release holes 56 . . . see FIG. 10(c)) to form the resonator structure of FIG. 10(d) which shown in greater detail FIG. 2(b). The resulting resonator structure is then released from the handle layer or wafer 54 by dissolving the $SiO_2$ release layer 52 (see FIG. 10(d)). The fixed electrodes depicted in FIG. 10(d) become the drive and sense electrodes 22 and 24.

Having now described the invention in accordance with the requirements of the patent statute, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary embodiments is presented for purposes of illustration and disclosure in accordance with the requirements of the patent statute. It is not intended to be exhaustive nor to limit the invention to the precise form(s) described, but only to enable others skilled in the art to understand how the invention may be suited for a particular use or implementation. The possibility of modifications and variations will now be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. A resonant accelerometer comprising: a movable proof mass, one or more springs connecting the movable proof mass to an anchor, and one or more capacitive transduction gaps defined between the movable proof mass and one or more corresponding fixed electrodes, wherein static displacement of the movable proof mass in response to acceleration applied to the anchor modifies an electrostatic stiffness imparted by one or more of the capacitive transduction gaps adjacent the movable proof mass, resulting in a corresponding change in a resonance frequency of the resonant accelerometer.

2. The resonant accelerometer of claim 1 wherein said springs temporarily dispose said moveable proof mass in a first or at rest position relative to said anchor and further including means for applying DC bias potentials to said fixed electrodes, the DC bias potential causing the movable proof mass to move the from said first or at rest position to a second or displaced position relative to said anchor.

3. The resonant accelerometer of claim 2 wherein one or more of the capacitive transduction gaps is configured to actuate harmonic motion of the movable proof mass relative to said displaced position, at least one corresponding electrode of which is termed a drive electrode, and the one or more of the capacitive transduction gaps is configured to sense the harmonic motion of the movable proof mass, at least one corresponding electrode of which is termed a sense electrode.

4. The resonant accelerometer of claim 3, wherein DC bias voltages are applied to the movable proof mass, the drive electrode, and the sense electrode, such that the movable proof mass is held at a DC bias voltage different than the DC bias voltages applied to the drive and sense electrodes.

5. The resonant accelerometer of claim 3, wherein a harmonic motional signal received by the sense electrode is fed back by a feedback circuit to the drive electrode to create a sustained oscillation at the resonance frequency.

6. The resonant accelerometer of claim 5, wherein the feedback circuit is an analog circuit.

7. The resonant accelerometer of claim 5, wherein the feedback circuit is a mixed signal analog and digital circuit.

8. The resonant accelerometer of claim 3, wherein the resonance frequency is read out through a frequency detector.

9. The resonant accelerometer of claim 8, wherein the frequency detector comprises an analog circuit.

10. The resonant accelerometer of claim 8, wherein the frequency detector comprises a mixed signal analog and digital circuit.

11. The resonant accelerometer of claim 1, wherein the resonance frequency is configured to be between 10 kHz and 100 kHz.

12. The resonant accelerometer of claim 1, further including mechanical stoppers comprising a portion of the movable proof mass and a portion of the anchor to prevent shorting of the capacitive transduction gaps.

13. The resonant accelerometer of claim 12, wherein the mechanical stoppers have a plurality of stopper contact surfaces that may: be all flat, be a combination of flat and curved or triangular bumps, or be solely curved or triangular bumps.

14. The resonant accelerometer of claim 1, wherein release holes are designed into the movable proof mass to reduce mass and increase the resonance frequency.

15. The resonant accelerometer of claim 14, wherein the release holes are used to free the movable proof mass to move by chemically etching the buried oxide layer underneath the silicon through the release holes.

16. The resonant accelerometer of claim 1 wherein the movable proof mass comprises a single moveable proof mass, the one or more springs connecting the single moveable proof mass to an anchor, and the one or more capacitive transduction gaps define a resonant accelerometer structure.

17. The resonant accelerometer of claim 16 wherein the one or more fixed electrodes are coupled to an electronic circuit capable of driving a primary in-plane resonance mode of the single moveable proof mass of the accelerometer structure into sustained oscillation and a frequency modulation (FM) readout of an up-converted inertial acceleration signal which is mapped onto FM sidebands of the primary resonance oscillation frequency.

18. The resonant accelerometer of claim 16 wherein the single moveable proof mass of the accelerometer structure, in use, can be operated both statically (off resonance) to acquire an inertial acceleration force and harmonically (on resonance) so that the resonant accelerometer can then be used as a FM readout mechanism corresponding to the inertial acceleration force.

19. The resonant accelerometer of claim 1 wherein the movable proof mass and one or more corresponding fixed electrodes along with one or more of the capacitive transduction gaps defined therebetween are configured to actuate harmonic motion of the movable proof mass.

20. A resonant MEMS accelerometer structure having a single proof mass in combination with an electronic circuit capable of driving a primary in-plane resonance mode of the single proof mass into sustained oscillation and a frequency modulation (FM) readout of an up-converted inertial acceleration signal which is mapped onto FM sidebands of the primary resonance oscillation frequency.

21. The resonant MEMS accelerometer structure of claim 20 has a quality factor greater than 10,000, and a primary in-plane resonance mode with a natural frequency greater than 10 kHz.

22. An accelerometer structure having a single mass device which in use can be operated both statically (off resonance) to acquire an inertial acceleration force and harmonically (on resonance) so that the same structure can then be used as a FM readout mechanism of the inertial acceleration signal.

23. The accelerometer structure of claim 22 wherein the single mass is supported by springs and wherein an electrostatic spring stiffness nonlinearity of variable capacitive gaps produces a desired FM tuning effect in response to acceleration being sensed by the single mass.

24. The accelerometer structure of claim 22 wherein the electrostatic spring stiffness nonlinearity of the variable capacitive gaps is induced by applying different DC biases to the capacitive gaps.

25. A method for measuring acceleration utilizing a resonant accelerometer, the method comprising:
 a) displacing a movable mass of the resonant accelerometer from a first position to a second position by applying different DC bias potentials to drive and sense electrodes of the resonant accelerometer;
 b) resonating the movable proof mass at a resonance frequency in the presence of an acceleration to be measured, the acceleration of the resonating proof mass modulating the resonance frequency of the movable proof mass;
 c) detecting and demodulating the modulated resonance frequency; and
 d) applying a scale factor to the detected and demodulated resonance frequency to thereby convert the detected and demodulated resonance frequency into an output signal, wherein the output signal reflects a measurement of the acceleration.

26. A method for measuring an acceleration utilizing a resonant accelerometer having a proof mass and capacitive gap transducers disposed on opposite sides of the proof mass, the method comprising:
displacing the proof mass from a first position to a second position by applying different DC bias voltages to the capacitive gap transducers disposed on opposite sides of the proof mass;
resonating the movable proof mass at a resonance frequency in the presence of the acceleration to be measured, the acceleration of the resonating proof mass modulating the resonance frequency of the movable proof mass;
detecting and demodulating the modulated resonance frequency; and
applying a scale factor to the detected and demodulated resonance frequency to thereby convert the detected and demodulated resonance frequency into an output signal, wherein the output signal reflects a measurement of the acceleration.

27. An apparatus for increasing a scale factor of a resonator, the scale factor representing an amount of frequency change of the resonator per unit of acceleration, the resonator including a movable proof mass and capacitive gap transducers disposed on opposing sides of the proof mass, the apparatus comprising: means for applying different DC bias potentials to the capacitive gap transducers disposed on the opposing sides of the proof mass to thereby displace the proof mass asymmetrically relative to capacitive gaps of the capacitive gap transducers.

28. A resonant accelerometer comprising: a movable proof mass, one or more springs connecting the movable proof mass to a frame, said springs temporarily disposing said moveable proof mass in a first position relative to said frame and means for applying a DC bias to electrodes disposed adjacent said proof mass, the DC bias causing the movable proof mass to move the from said at rest position to a second position relative to said frame.

29. The resonant accelerometer of claim 28 wherein the one or more spring support movement of movable proof mass relative to said frame and the electrodes disposed adjacent said proof mass cooperate with additional electrodes on said movable proof mass to form capacitive gaps therebetween.

* * * * *